C. F. BURROUGHS & F. B. NORTHRUP.
POWER MOLDING PRESS.
APPLICATION FILED SEPT. 23, 1913.
1,126,953.
Patented Feb. 2, 1915.
3 SHEETS—SHEET 1.
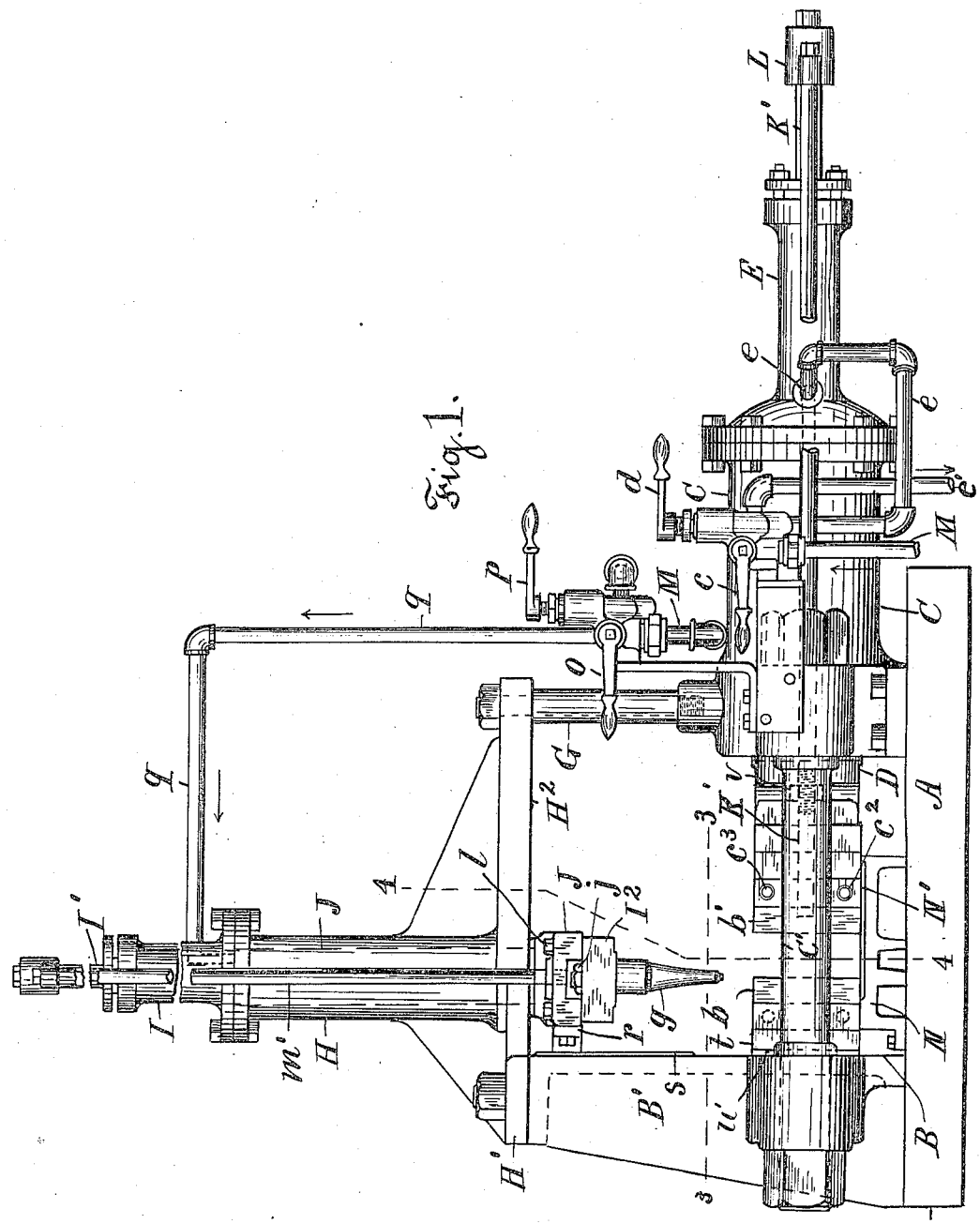

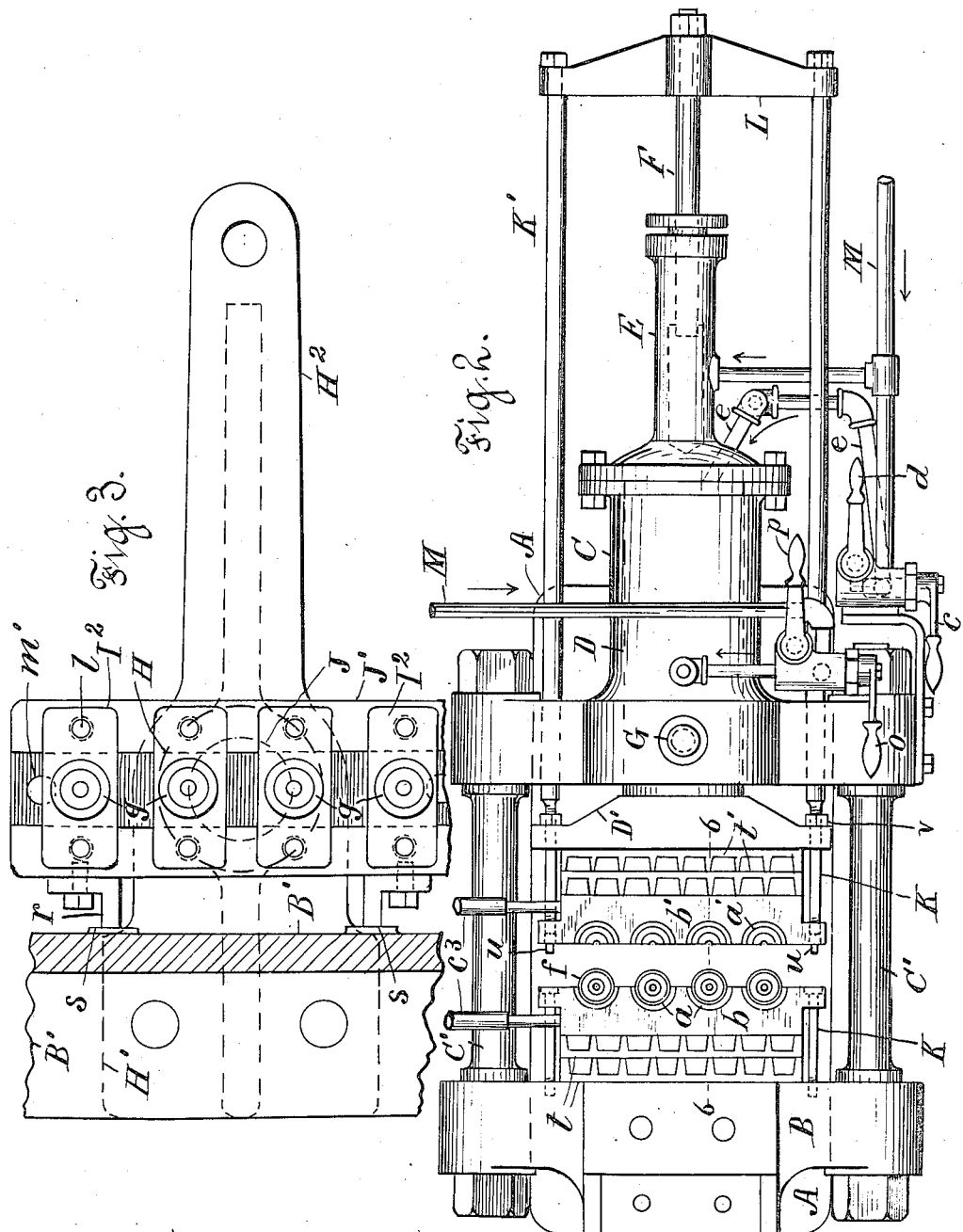

C. F. BURROUGHS & F. B. NORTHRUP.
POWER MOLDING PRESS.
APPLICATION FILED SEPT. 23, 1913.
1,126,953.
Patented Feb. 2, 1915.
3 SHEETS—SHEET 3.
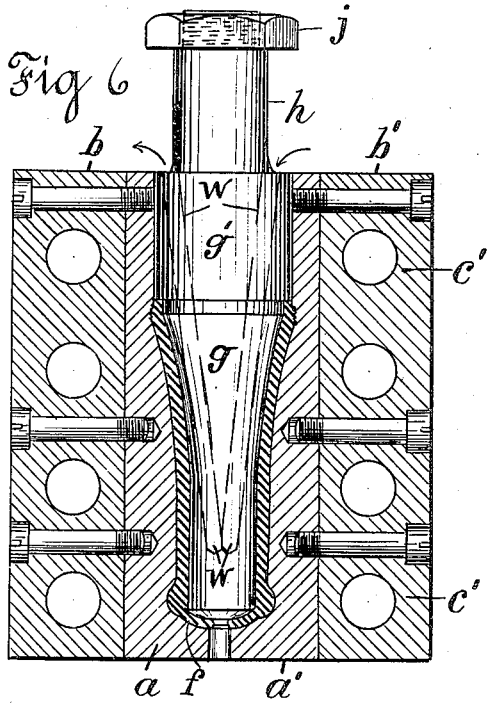
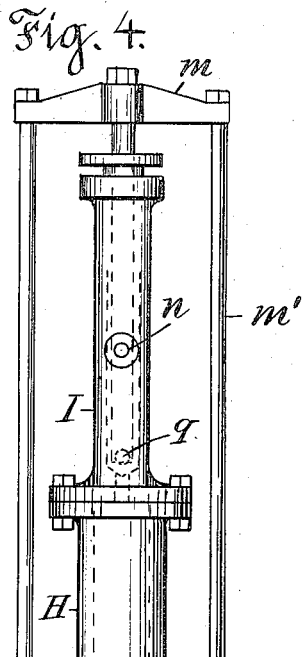
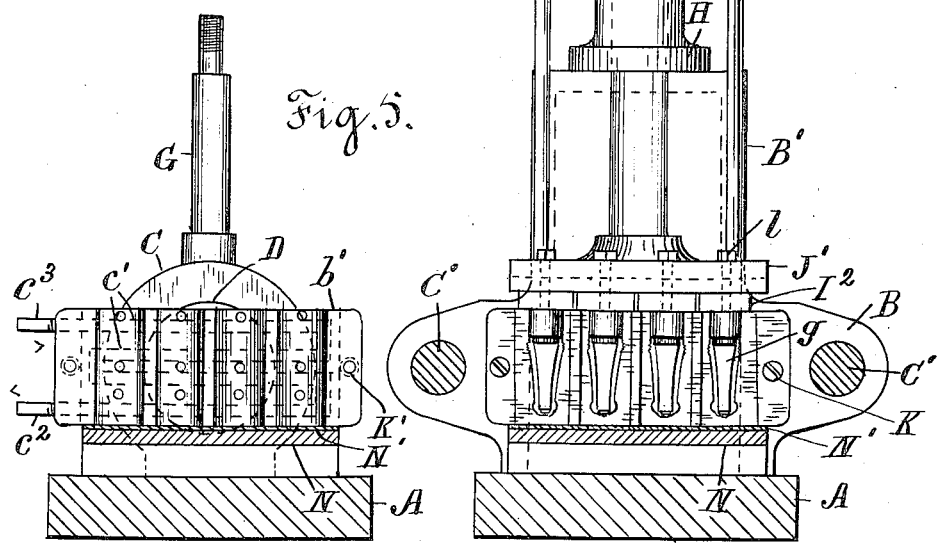

UNITED STATES PATENT OFFICE.

CHARLES F. BURROUGHS, OF EAST ORANGE, AND FRANCIS B. NORTHRUP, OF ORANGE, NEW JERSEY, ASSIGNORS TO THE CHARLES BURROUGHS COMPANY, OF NEWARK, NEW JERSEY, A CORPORATION OF NEW JERSEY.

POWER MOLDING-PRESS.

1,126,953.     Specification of Letters Patent.     Patented Feb. 2, 1915.

Application filed September 23, 1913. Serial No. 791,289.

*To all whom it may concern:*

Be it known that we, CHARLES F. BURROUGHS, residing at 122 Prospect street, East Orange, county of Essex, and State of New Jersey, and FRANCIS B. NORTHRUP, residing at 106 Day street, Orange, county of Essex, and State of New Jersey, both citizens of the United States, have invented certain new and useful Improvements in Power Molding-Presses, fully described and represented in the following specification and the accompanying drawings, forming a part of the same.

This invention relates to an apparatus for pressing plastic material in molds, and is especially adapted for operating with molds formed in separable halves and open at one edge of their joint to admit a core which may be moved into the mold when closed, to compress the material therein and form a cored opening in the finished article.

To perform such operations, the press is provided with an abutment upon which one of the mold-parts is secured, a plunger movable to and from the abutment upon which an opposed mold-part is secured, and a plunger operating at right angles, or any other desired angle to the joint of the mold, and carrying a force and core to enter the mold by an opening at one edge of the joint, to hollow out and compress the material in the mold. The press thus has plungers operating at an angle with one another, one of such plungers opening and closing the mold while the other moves a force or core in and out of the mold to perform any desired operation upon the material therein.

The construction of this invention is also especially adapted to use with molds which require heating to soften the plastic material during the molding operation, and also in many cases require cooling to set, harden, or cure the material within the mold, before its removal therefrom.

Where plastic material is placed in one part of the mold and the complemental part fitted thereto by the operator, slight errors in the adjustment of the mold-parts often cause great injury to the parts when put in the press and forced powerfully together; and one object of the present invention is to avoid any handling of the mold-parts and any misplacement of the same, by securing them in the press during the entire time that they are used, and guiding them in such manner that they are accurately fitted together before subjected to pressure. In the present construction, this is effected by securing one of the mold-parts to a rigid abutment and securing the opposite mold-part to a movable plunger, and guiding the movable mold-part accurately in its movements to and from the stationary mold-part so that the parts may fit accurately together in the molding operation. To operate with molds thus secured in the press, it is necessary to make the holders of the mold-parts with passages through which steam or cold water can be circulated, so as to heat and cool the molds with rapidity in their working positions.

The actuating plungers are shown herein propelled by water, but they may be propelled by screw, toggle lever, or any other suitable agency.

The invention will be understood by reference to the annexed drawing, in which—

Figure 1 is a side elevation of the press; Fig. 2 is a plan of the same with the fixtures above the abutment removed; Fig. 3 is a section on line 3—3 in Fig. 1 looking upwardly; Fig. 4 is a cross section on line 4—4 in Fig. 1 looking toward the abutment; Fig. 5 is a cross section on line 4—4 in Fig. 1 looking toward the primary cylinder C; and Fig. 6 is a vertical section through the mold on line 6—6 in Fig. 2 with an elevation of the core therein.

A bed A is shown provided at one end with an abutment B from which a column B' is projected upwardly.

A hydraulic cylinder C for the primary plunger D is shown attached to the opposite side of the bed, and a cylinder E for a return-piston F is shown attached to the outer end of the cylinder C. Braces C' connect the abutment and cylinder.

A tie-rod G is projected upwardly from the cylinder and formed with shoulder at the top, on a level with the top of the column B'.

An auxiliary cylinder H has a foot H' resting upon the top of the column and a longer foot H² resting upon the shoulder of the tie-rod and is secured to both.

A return-cylinder I is affixed to the top of the auxiliary cylinder and contains a return-piston I'.

A plurality of molds is shown herein, formed of complemental dies $a$ and $a'$ which are carried by holders $b$ and $b'$. The holder $b$ is shown in Fig. 2 secured to the face of the abutment B by bolts K which thus hold it securely in its working position; and the holder $b'$ is shown fixed to the head D' of the primary plunger, by draw-rods K' which are connected by a crosshead L with the return-piston F the holders have flat bottom edges to rest on a horizontal guide.

Fig. 6 shows the construction of the molds represented in the press, being of suitable character to mold the body $f$ for a telephone receiver.

In Fig. 2, the die-holders $b$ and $b'$ are shown formed each with four vertical semicircular recesses adapted to receive four dies having cylindrical exterior, the recesses extending, as shown in Fig. 6, to the lower edges of the die-holders.

A seat N is fixed upon the bed A beneath the die-holders and is provided with a hardened steel face N' which fits close to the bottom edges of the die-holders and supports and guides them in a straight path. The lower ends of the dies thus rest upon such steel plate, which supports them during the molding operation.

Passages $c'$ are formed in the die-holders, and steam and water can be circulated through such passages by hose connections $c^2$ and $c^3$. (See Figs. 5 and 6).

The plunger D and piston F operate in opposition to one another, as the plunger advances the holder $b'$ toward the holder $b$, and holds the molds closed during the molding operation, at the close of which the water pressure upon the plunger D is released, and the piston F then automatically retracts the plunger and the die-holder $b'$, as shown in Fig. 2.

The dies $a'$ in Fig. 2 are shown empty, but the four dies $a$ are shown each with a telephone receiver body $f$ in it ready for removal from the dies, as at the close of the molding operation.

The cylinder E for the return-piston F is under constant water pressure from the main supply-pipe M and thus requires no manipulation of valves by the operator; but handles $c$ and $d$ are shown in Figs. 1 and 2 for admitting water to and releasing it from the primary cylinder C. When the lever $c$ is operated the water under pressure flows into the outer end of the cylinder C in the direction of the arrow shown in Fig. 2 adjacent to the pipe $e$ and moves the mold-parts forcibly together. When the lever $c$ is reversed and the lever $d$ moved, the water flows through the pipe $e$ in the reverse direction and escapes by the water-pipe $e'$, shown in Fig. 1.

The operation of the auxiliary plunger in moving the core is illustrated in Fig. 4, where the auxiliary plunger J is shown moved downwardly, carrying a core into each of the four molds, which are open at the top as shown in Fig. 6, for inserting the plastic material in the mold when closed, and receiving a shank $g'$ upon the core which fits snugly in the mouth of the mold so as to crowd the material forcibly into the mold-cavity. The shank is of parallel form, so that it slides within the mouth, and the core operates to hollow out the molded article while the shank operates to compress and conform the material to the dies, the structure thus operating as a combination core and force.

As the centers of the dies are immovably fixed in the construction of the die-holder, it is necessary that the cores should be held adjustably upon the head J' of the plunger J, so as to set them accurately in the centers of the molds. Each core is, therefore, formed with a stem $h$ secured in a head-block I² by a nut $j$, and the head-block, as shown in Figs. 3 and 4, secured upon the head J' of the auxiliary plunger by bolts $l$.

By fitting the bolts $l$ loosely in the holes in the head J', the head-block of each core may be slightly adjusted upon the plunger-head so as to enter the mold in precisely the desired position.

The return-piston I' is connected with the piston-head J' by a crosshead $m$ and draw-rods $m'$, and its cylinder I is supplied constantly with water under pressure by the pipe $n$.

A hand-lever $o$ operates a valve which is supplied with the water under pressure to deliver the same through the pipe $q$ to the auxiliary cylinder H when required, and a hand-lever $p$ operates a valve to release the water from such auxiliary cylinder, upon which the return-piston J operates automatically to raise the piston-head J' with the cores $g$ to the position shown in Fig. 1. The plunger-head J' is shown in Figs. 1 and 3 provided with lugs $r$ fitted to bear upon seats $s$ on the inner face of the abutment column B', to guide the head accurately in its downward movement.

The lugs are made separate from the head and bolted thereto so that they may be packed outwardly by inserting thin layers beneath them, when worn by friction against the seats.

It will be understood that the die-holder $b$ must be adjusted upon the abutment in exactly the right position to receive the cores when the die-holder $b'$ is pressed toward it, and this is effected by packing-blocks $t$ shown in Figs. 1 and 2, inserted between the die-holder and the abutment, and constructed also to serve as heat-insulators to prevent the heat conveyed to the die-holder $b$ from transmission to the abutment, which would greatly subtract from such heat.

To reduce the transmission of heat as much as possible, the packing-blocks are formed with a thin plate at one side and ribs extending therefrom to form the bearing-surface of the opposite side. Such ribs contact with only a small proportion of the die-holder, and thus transmit less heat than a solid plate, and a layer of non-conducting material $u'$ can also be inserted between such plates and the abutment. (Shown in Fig. 1). Similar packing-plates $t'$ are shown inserted between the die-holder $b'$ and the head $D'$ of the primary plunger, and also serve to prevent the absorption of heat from the die-holder by such plunger-head.

The draw-rods not only serve to retract the die-holder and primary plunger, but afford a connection between the die-holder and the plunger-head which secures them firmly together, by nuts $v$ upon the rods. One of the die-holders is provided with dowels $u$ fitted to corresponding sockets in the opposite die-holder, and the adjustment of the die-holders upon the abutment and plunger-head is effected when the two die-holders are in contact, and the dowels engaged with the sockets. Such adjustment thus maintains the dies in their working relation when separated and again brought together.

The particular construction of the die-holders and dies is not claimed herein, as it is made the subject of a separate application.

From the above description it will be seen that the construction permits the complemental dies which form a mold to be secured in the press and moved accurately to and from one another, and heated or cooled during the molding operation, and a core also moved into and out of the mold to perform any desired operation upon the material therein.

All the evils which result from heating the molds apart from the press are thus avoided, and injury to the molds by maladjustment of the same is rendered impossible.

Our invention thus enables the molding operation to be performed repeatedly and the work accomplished quickly, and turned out more accurately with absolute security to the dies.

In many cases the heating of the mold suffices for suitably molding the material, but the force or core may also be heated, if desired, by drilling connecting channels $w$ inside its body, as shown in Fig. 6, and connecting their opposite ends to a channel extended through the head-block $I^2$ and provided with pipe-connections at its opposite ends to introduce and withdraw the heating or cooling fluid, or connecting pipes directly to the channels $w$. Where a plurality of cores is mounted by head-blocks upon a head $I^2$, as shown herein, the passages in the head-blocks may be connected serially by piping, so as to conduct the steam or water successively through all of the cores. Where no cavity is required in the article, a force is merely pressed into the opening of the mold to compress the material therein.

We do not claim the mere combination of a plunger for holding the die-parts together with a plunger operating laterally to press a force or core into the die, but the novel combinations which we have described and specifically pointed out in the claims.

Having thus set forth the nature of the invention what is claimed herein is:

1. In a power molding press having an abutment and a primary plunger movable to and from the same, the combination, with die-holders attached respectively to the abutment and the primary plunger, of means for heating the die-holders, complemental dies fitted in the die-holders and heated by contact therewith, and heat-insulating packing-plates operating both to adjust the dies and to insulate them upon the abutment and plunger, and an auxiliary plunger movable to and from the said dies and carrying a force to enter the mold-cavity.

2. In a power molding press having an abutment and a primary plunger movable to and from the same, the combination, with the abutment and plunger-head, of recessed die-holders fixed to such abutment and head, means for heating the die-holders, complemental dies fitted detachably to the recesses in the holders and heated thereby, and heat-insulating packing-plates operating both to adjust the fixed die-holder and to insulate both the holders upon the abutment and plunger.

3. In a power molding press having an abutment, and a primary cylinder with plunger movable to and from the abutment, the combination, with such parts, of die-holders containing complemental dies supported respectively upon the abutment and the primary-plunger, means for heating the die-holders, and heat-insulating packing-plates supporting said holders upon the abutment and plunger, and a return-plunger having draw-rods extended by the sides of the primary cylinder and connected to the head of the primary plunger and provided with means for clamping the die-holder and packing-plates upon the said head.

4. In a power molding press, the combination, with a bed having an abutment and a primary cylinder with plunger movable to and from the abutment, of a series of complemental dies supported respectively upon the abutment and the primary plunger, with the joint of such dies and mouth of their cavity upon their upper side, an auxiliary cylinder supported upon the said bed with auxiliary plunger movable to and from the said dies and having a head with flat lower surface, and a series of cores having each a head-block secured adjustably upon such surface of the head and adapted to enter the mold cavities in the dies.

5. In a power molding press, the combination, with a suitable bed carrying an abutment, of a stationary die supported upon such abutment with packing-plates to adjust its joint-face to a definite point, a hydraulic cylinder attached to the bed with a primary plunger movable to and from the said die and carrying a complemental die, and an auxiliary plunger supported upon the bed at right angles to the path of the primary plunger on a line with the opening of the stationary die.

6. In a power molding press, the combination, with a bed having an abutment and a primary plunger movable to and from the abutment, of a series of complemental dies supported respectively upon the abutment and the primary plunger, with the joint of such dies upon the upper side, an auxiliary plunger movable vertically to and from such joint and carrying a series of cores each having a shank larger than the body of the core, and each mold having its mouth fitted snugly to the shank of the core, whereby the core hollows out the molded article while the shank compresses and conforms the material to the cavity.

7. In a power molding press, the combination, with a horizontal bed, of an upright abutment at one end of the same, a primary cylinder supported upon the bed with plunger movable in opposition to said abutment, complemental flat edged dies supported respectively upon the abutment and the primary plunger, a guide upon the bed fitted to the flat edges of the dies to hold them from turning and faced with a steel plate to support the strain in molding, an auxiliary cylinder supported upon the said bed with auxiliary plunger movable to and from the said dies, and having a cross-head carrying a core for the dies, and a return plunger connected to the said crosshead to withdraw the same from the dies.

8. In a power molding press, the combination, with a horizontal bed, of an upright abutment at one end of the same with column extended upwardly to support a cylinder foot, a primary cylinder supported upon the bed with plunger movable in opposition to the said abutment the cylinder having a tie-rod projected upwardly therefrom to support an auxiliary cylinder foot, complemental dies supported respectively upon the abutment and the primary plunger, and an upright auxiliary cylinder having a foot attached to the abutment column and a foot attached to such tie-rod and provided with a plunger having a crosshead with core movable to and from the dies, and means upon the said crosshead and column to keep the crosshead from turning in the vertical movement of the plunger.

9. In a power molding press, the combination, with a suitable bed, of an abutment with stationary die supported thereon and a primary plunger with a complemental die movable horizontally to and from the abutment, an auxiliary cylinder supported upon the bed at an angle to the movement of the primary plunger with a force for the die fixed thereto, a steam or water passage within the said force, and a flexible steam or water connection to the said passage for heating or cooling the force in its movements to and from the die.

10. In a power molding press, the combination, with a suitable bed, of an abutment upon one end and a primary plunger movable horizontally to and from said abutment, the abutment and plunger carrying die-holders having flat lower edges, dies fitted within the holders flush with the said edges and a seat upon the bed below the die-holders fitted close to the bottom edges of the same to guide them in a straight path and support them during the molding operation.

In testimony whereof we have hereunto set our hands in the presence of two subscribing witnesses.

CHARLES F. BURROUGHS.
FRANCIS B. NORTHRUP.

Witnesses:
FRANK L. MORTON,
ALBERT K. BOUGHNER.